US010971009B2

(12) United States Patent
Anantharam et al.

(10) Patent No.: US 10,971,009 B2
(45) Date of Patent: Apr. 6, 2021

(54) EXTRACTING EVENTS AND ASSESSING THEIR IMPACT ON A TRANSPORTATION NETWORK

(71) Applicant: International Business Machines Corporation, Armonk, NY (US)

(72) Inventors: Pramod Anantharam, Fairborn, OH (US); Raj Gupta, Haryana (IN); Biplav Srivastava, Noida (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 13/930,267

(22) Filed: Jun. 28, 2013

(65) Prior Publication Data
US 2015/0006644 A1   Jan. 1, 2015

(51) Int. Cl.
*G08G 1/123* (2006.01)

(52) U.S. Cl.
CPC .......... *G08G 1/123* (2013.01); *H04L 2201/00* (2013.01)

(58) Field of Classification Search
CPC ............ H04L 2201/00; G06Q 2220/00; G06Q 10/00; G08G 1/123; G08G 1/01
See application file for complete search history.

(56) References Cited

U.S. PATENT DOCUMENTS

| | | | | |
|---|---|---|---|---|
| 2004/0068364 | A1* | 4/2004 | Zhao | G08G 1/096844 701/468 |
| 2006/0287818 | A1* | 12/2006 | Okude | G01C 21/3492 701/423 |
| 2008/0004793 | A1* | 1/2008 | Horvitz | G08G 1/01 701/487 |
| 2008/0004794 | A1* | 1/2008 | Horvitz | G01C 21/34 701/414 |
| 2008/0088480 | A1 | 4/2008 | Rozum et al. | |
| 2008/0120688 | A1* | 5/2008 | Qiu et al. | 726/1 |
| 2010/0088026 | A1* | 4/2010 | Manolescu | G08G 1/20 701/469 |
| 2010/0280748 | A1 | 11/2010 | Mundinger et al. | |
| 2010/0312466 | A1* | 12/2010 | Katzer et al. | 701/201 |

(Continued)

FOREIGN PATENT DOCUMENTS

| | | |
|---|---|---|
| EP | 1657693 A2 | 5/2006 |
| EP | 2196971 A1 | 6/2010 |

OTHER PUBLICATIONS

Hinze, "Chapter 2: Analysis of Application Scenarios," 12 pages. Available at http://www.diss.fu-berlin.de/diss/servlets/MCRFileNodeServlet/FUDISS_derivate_000000001083/02_hinze_chapter02.pdf?hosts=accessed Jun. 21, 2013.
Regional Rail Link, "Managing traffic impacts," Jul. 2012, 2 pages, www.regionalraillink.vic.gov.au. Available at http://www.regionalraillink.vic.gov.au/_data/assets/pdf_file/0010/63739/Factsheet-managing-traffic-impacts-July-2012.pdf accessed Jun. 21, 2013.

(Continued)

*Primary Examiner* — Backhean Tiv
*Assistant Examiner* — Jihad K Boustany
(74) *Attorney, Agent, or Firm* — Ference & Associates LLC (57) ABSTRACT

Methods and arrangements for assessing impact of an event on a network. An event notification is received relative to traffic in the network. Metadata are extracted from the notification, and the extracted metadata are converted into a predetermined format for processing. The converted metadata are received, and an impact of the event on traffic in the network is determined. Other variants and embodiments are broadly contemplated herein.

18 Claims, 7 Drawing Sheets

(56) References Cited

U.S. PATENT DOCUMENTS

2011/0224898 A1* 9/2011 Scofield ............ G01C 21/3492
                                                           701/532
2012/0116668 A1  5/2012 Belinchon-Vergara et al.
2013/0024525 A1* 1/2013 Brady ................... G06Q 10/08
                                                           709/206

OTHER PUBLICATIONS

New South Wales' Transport Management Centre, "Hands on Control," 20 pages. Available at http://www.rta.nsw.gov.au/trafficinformation/downloads/tmcbrochure.pdf accessed Jun. 21, 2013.

North Yorkshire County Council, "Transport-Journey Planning," webpage last updated Aug. 16, 2012, 3 pages. Available at http://www.northyorks.gov.uk/index.aspx?articleid=12631 accessed Jun. 21, 2013.

London Buses-Mayor of London, "Temporary changes to bus services for the London 2012 Olympic and Paralympic Games," Position as of Jul. 2012, 86 pages. Available at http://www.tfl.gov.uk/assets/downloads/bus-service-alterations-2012-games.pdf accessed Jun. 21, 2013.

Koller, Daphne et al., "Probabilistic Graphical Models: Principles and Techniques," in Adaptive Computation and Machine Learning, Thomas Dietterich, Editor, 2009, 1265 pages, The MIT Press, Cambridge, Massachusetts, USA.

Huang, Bingyan et al., "Traffic Incident Impact Analysis with Random Matrix Theory and Cluster Analysis," IEEE, 2010, pp. 198-200, IEEE Digital Library.

Lv, Weifeng et al., "A History Data Based Traffic Incident Impact Analyzing and Predicting Method," 2010 International Conference on Electronics and Information Engineering (ICEIE 2010), Kyoto, Japan, Aug. 1-3, 2010, vol. 2, pp. 219-223, IEEE Digital Library.

\* cited by examiner

| STOPID | STOPNAME | OID | NAME | LAT | LON |
|---|---|---|---|---|---|
| 1695 | rithala vill | 113 | Rithala | 28.721 | 77.107 |
| 3839 | pratap nager | 114 | Pratap Nagar | 28.667 | 77.199 |
| 3848 | pulbangash | 115 | Pulbangash | 28.666 | 77.207 |
| 3803 | guru dronacharya | 127 | Guru Dronacharya | 28.482 | 77.102 |
| 3308 | najaf garh | 131 | Arjan Garh | 28.481 | 77.126 |
| 1765 | petrol pump | 147 | HP Petrol Pump | 28.561 | 77.222 |
| 578 | hp depot | 147 | HP Petrol Pump | 28.561 | 77.222 |
| 2198 | indian oil | 149 | Indian Oil Petrol Pump | 28.568 | 77.254 |
| 1142 | indian oil qtr | 149 | Indian Oil Petrol Pump | 28.568 | 77.254 |
| 1901 | talkatora stadium | 204 | Talkatora Stadium | 28.623 | 77.193 |

*Map names*

EXTRACTING EVENTS AND ASSESSING THEIR IMPACT ON A TRANSPORTATION NETWORK

BACKGROUND

SMS, or short message service, is usually available on mobile phones and has enjoyed widespread use for sending text messages between mobile phone subscribers but also for communicating with other entities. For instance, a given SMS subscription might permit a mobile phone user to receive notifications from private or public organizations.

Notifications regarding traffic or other transportation events (e.g., accidents, points of congestion) can be of great utility to a user. However, it is usually the case that stock or "one size fits all" notifications are communicated by city or other governmental agencies but do not take into account a user's specific circumstances, especially in a way that could be leveraged for greater benefit to a user in connection with a trip (via private vehicle or public transportation) that is either planned or in transit.

BRIEF SUMMARY

In summary, one aspect of the invention provides a method of assessing impact of an event on a network, the method comprising: utilizing at least one processor to execute computer code configured for: receiving an event notification associated with an event affecting traffic in the network; extracting metadata from the event notification, the metadata including at least one of: location information, time information, and event type information; converting the extracted metadata into a predetermined format for processing; receiving the converted metadata; and determining, using the converted metadata, an estimated impact of the event on traffic in the network.

Another aspect of the invention provides an apparatus for assessing impact of an event on a network, the apparatus comprising: at least one processor; and a computer readable storage medium having computer readable program code embodied therewith and executable by the at least one processor, the computer readable program code comprising: computer readable program code configured to receive an event notification associated with an event affecting traffic in the network; computer readable program code configured to extract metadata from the event notification, the metadata including at least one of: location information, time information, and event type information; computer readable program code configured to convert the extracted metadata into a predetermined format for processing; computer readable program code configured to receive the converted metadata; and computer readable program code configured to determine, using the converted metadata, an estimated impact of the event on traffic in the network.

A further aspect of the invention provides a computer program product for assessing impact of an event on a network, the computer program product comprising: a computer readable storage medium having computer readable program code embodied therewith, the computer readable program code comprising: computer readable program code configured to receive an event notification associated with an event affecting traffic in the network; computer readable program code configured to extract metadata from the event notification, the metadata including at least one of: location information, time information, and event type information; computer readable program code configured to convert the extracted metadata into a predetermined format for processing; computer readable program code configured to receive the converted metadata; and computer readable program code configured to determine, using the converted metadata, an estimated impact of the event on traffic in the network.

An additional aspect of the invention provides a method comprising: receiving at least one SMS notification relative to an event in a public transportation network; extracting metadata from the at least one SMS notification; and receiving the extracted metadata and thereupon estimating a scheduling delay relative to at least one location in the public transportation network.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-6 can be performed or utilized by way of a processing unit or units and system memory such as those indicated, respectively, at 16' and 28' in FIG. 7, whether on a server computer, a client computer, a node computer in a distributed network, or any combination thereof.

Broadly contemplated herein, in accordance with at least one embodiment of the invention, are methods and arrangements for receiving SMS messages from one or more sources (e.g., government sources) and outputting the same into a desired different format that might be of greater utility to a user. One example of a format for an SMS-reported event may be: <Type, Time (Reported, Published), Location (From, To, On), Description>. However, it may well be the case that there is a need or desire to report or process the event in something of a different format.

By way of illustrative example, in accordance with at least one embodiment of the invention, with SMS as an input medium, an event model can guide extraction of SMS messages and a database of extractions can be maintained for ongoing improvement. For instance, data can be kept to help tune the model at a later time to be even more effective; e.g., while having an event model permits knowledge of potential attributes from extractions, having a database of extractions can inform of the relative frequency of the occurrence of such attributes. Inasmuch as an SMS can contain embedded or inherent information that may be useful if properly processed, extraction as broadly contemplated herein can take such information and convert or transform it into a more easily "digestible" format for the user, or send it to another program or application/"app" (e.g., a journey planner) where it can be even more effectively leveraged in planning a current or future trip. Extraction can also be useful inasmuch as a single SMS may relate to several events (e.g., events for different locations conveyed in one and the same SMS message).

Figure 1:
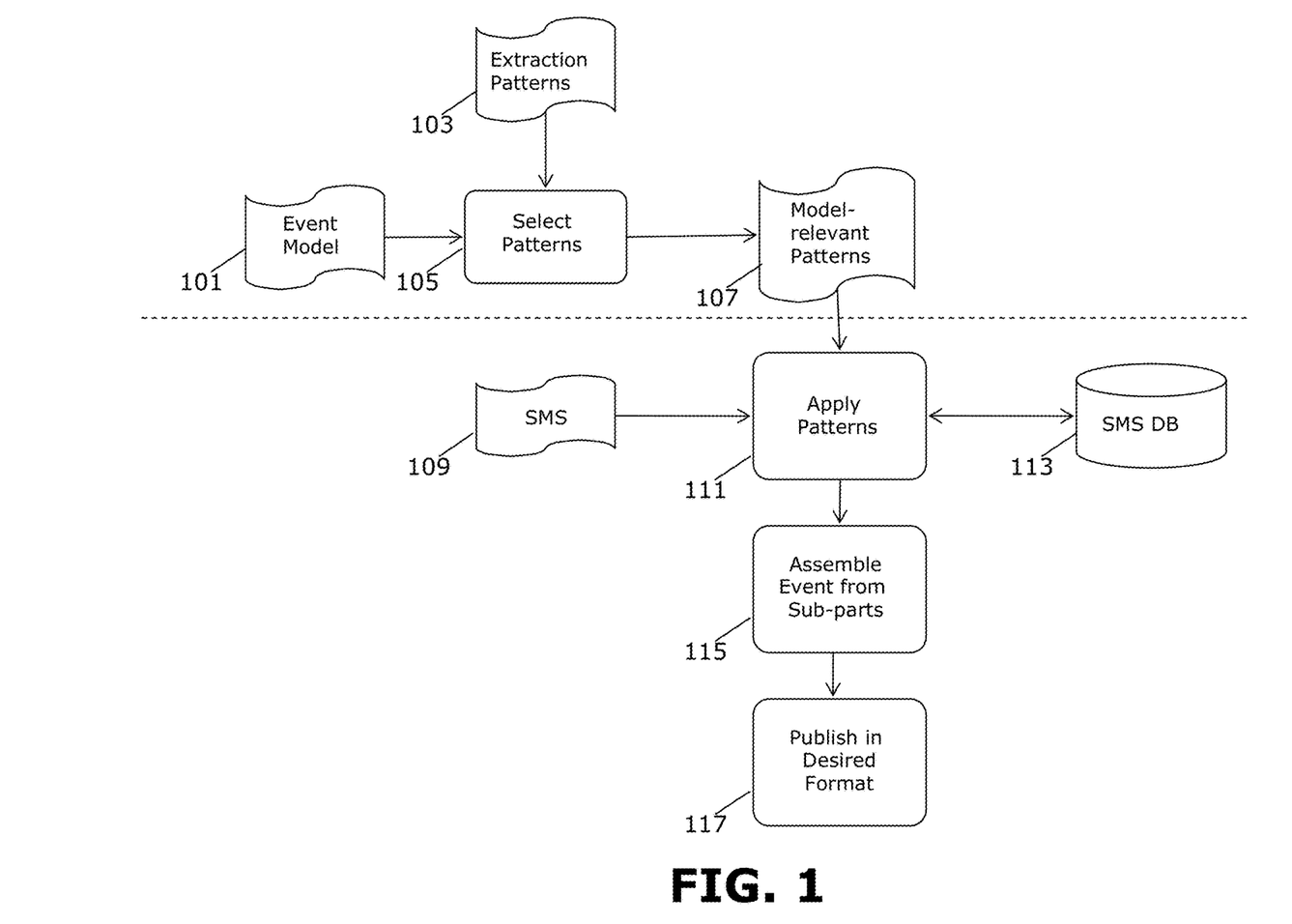
FIG. 1 shows a general process flow.

FIG. 1 shows a general process flow, in accordance with at least one embodiment of the invention. As shown, event models 101 and extraction patterns 103 can be combined to produce selectable patterns 105. From these, model-relevant patterns 107 can be chosen such that, e.g., a particular type of notification will correspond to a suitable manner of extraction. When an SMS 109 does come in, a model-relevant extraction pattern 111 is applied. (A connection can then be made with an SMS database 113, in order to store the incoming SMS for any future use and to calculate statistics on a relative frequency of attributes.) After extraction, a tangible event is assembled from parsed sub-parts of the SMS (115), and the event is then published in a predetermined (desired) format and/or sent to another program or application for further processing (117).

In accordance with at least one embodiment of the invention, the impact of an event can be assessed to leverage information or insights relative to impact on a particular aspect of a transportation network. For instance, an event (e.g., via SMS update from a government source) can be represented in a known event model including location and time (as set forth herein). If a public transportation network is involved, then normally events and notifications in connection therewith may most meaningfully relate to items such as stop locations, routes, trips, stop times and frequency. Alternatively, a representation of an event on a map may be meaningful in this or other settings, as would an expression of a potential delay that may be caused by an event.

Accordingly, broadly contemplated herein, in accordance with at least one embodiment of the invention, are methods and arrangements which serve to deal with potentially incomplete, imprecise and heterogeneous observations. A specification of domain knowledge may preferably be permitted for further reasoning/processing, and data from the domain (in play) can be used to validate and parameterize the existing domain knowledge. Historical information can also be incorporated into reasoning/processing.

By way of illustrative example with relation to aboveground public transportation networks (e.g., buses and on-street trolleys), in accordance with at least one embodiment of the invention, as events are reported, those stops in a given region affected by an event are identified. A delay with respect to arrival or departure at each stop is estimated. This calculation may consider an attenuation function based on event types and/or may consider factors such as the time of day and/or a history of such events. Delay estimates are propagated to neighboring stops, tailored to the time of day, schedule of the transport link in question and direction of travel. Estimates can be captured as conditional probability tables (CPTs), wherein, e.g., when a stop is accessed in an application (e.g., a journey application) or elsewhere, the CPTs can be used to return specific estimated values. A "neighboring" stop can be understood to be a stop in the vicinity of an event and/or a nearer/nearest stop of a public transportation network relative to a stop being considered (e.g., a predecessor or successor stop relative to a bus route).

In accordance with at least one embodiment of the invention, reasoning/processing with respect to traffic events involves qualitative and quantitative components. In the qualitative component, given an event, there are found the routes and stops that are affected. In the quantitative component, a delay probability is computed and subsequent routes or trips are ordered (e.g., upcoming future trips in the day are ranked based on the probability of them being impacted by the delay). Priors for events are found, event-delay associations are calculated and impacts (per route, stop, etc.) are propagated. ("Priors" of events, or previous examples of the same or similar events at one or more locations, can help in providing guidance upfront as to what might be a likelihood of one event or another with respect to a given place, city, country, etc.; they thus can represent a "baseline" from which to determine a relative likelihood of occurrence of different types of events.)

Figure 2:
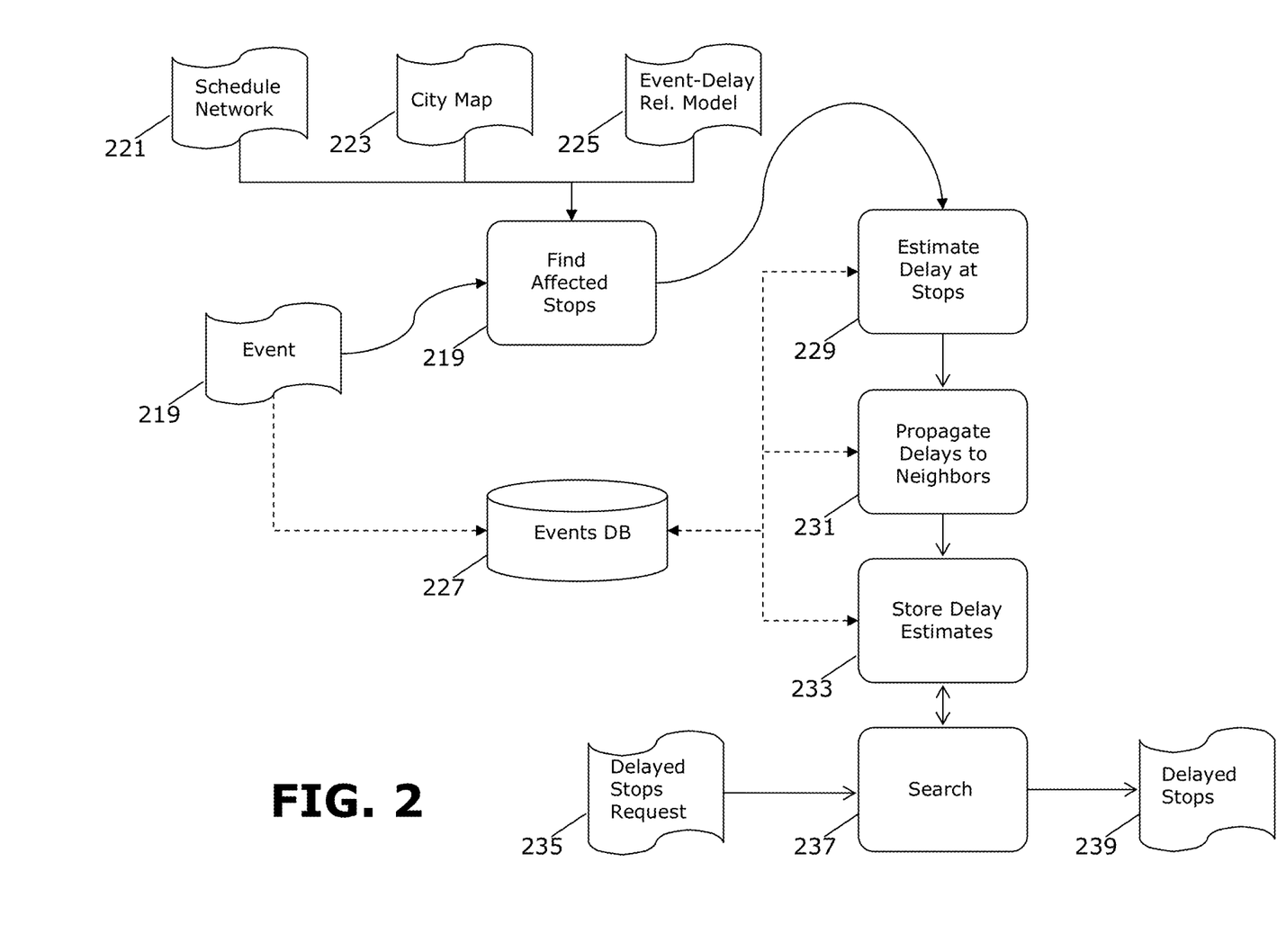
FIG. 2 shows a process flow relating to the impact of events on public transportation.

FIG. 2 shows a process flow relating to the impact of events on public transportation, in accordance with at least one embodiment of the invention. As shown, responsive to an event 219, affected stops are found via consultation with a schedule network 221, city map and event-delay relationship model 223. The event is logged in an events database 227. Delay at stops is estimated (229), which can include consulting the events database 227 (which includes historical event information). Delays are propagated to neighboring stops (also with potential consultation of the events database) (231) and delay estimates per stop are stored (233). When a request comes in, e.g., from a user or program/app (235), to obtain information on delayed stops, a search is conducted (237) and produces such output (239).

In accordance with at least one embodiment of the invention, qualitative reasoning/processing is employed to match an event location from an incoming SMS notification to a map (e.g., electronic or online map such as "OSM" or OpenStreetMap™, a collaborative mapping project supported by the OpenStreetMap Foundation of Sutton Coldfield, England, UK). This can include an exact location match, and/or a distance measure or voting scheme. (In a voting scheme, there ends up being a tie between options, the tie can be broken, e.g., with information about the frequency of different competing matches.) A stop name can also be matched to a map location, and the stop description can be enhanced with latitude-longitude coordinates.

Figure 3:
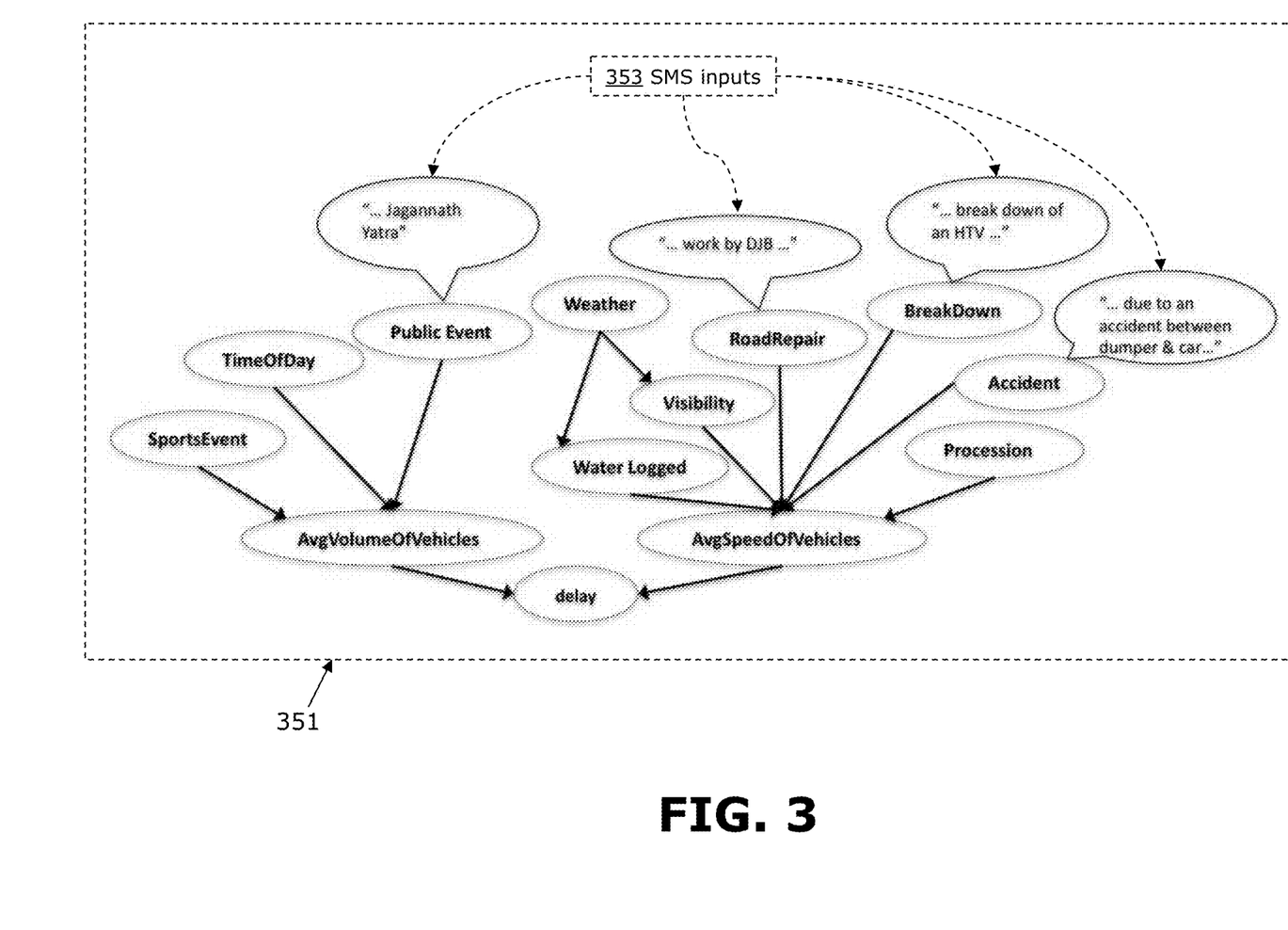
FIG. 3 schematically illustrates a Bayesian model of an impact of an event on a delay.

FIG. 3 schematically illustrates a Bayesian model of an impact of an event on a delay, in accordance with an illustrative and non-restrictive example in accordance with at least one embodiment of the invention. Each node in the network 351 shown, apart from SMS inputs 353, represents a random variable related to the traffic domain and each link imposes a structure among these random variables. In the example of FIG. 3, four events are reported on via SMS inputs: a public event (such as a concert); road repair; a breakdown; and an accident. Other inputs that are not reported on in the current example are: sports event; time of day; weather; and procession (e.g., parade or demonstration). Some inputs (sports event, time of day, public event) contribute to a determination of an average number of vehicles in a given road segment, while others (weather, road repair, breakdown, accident, procession) contribute to a determination of an average speed of vehicles in a given road segment. Other inputs can include general visibility (e.g., as may be affected by fog or driving rain) and road waterlogging; both of these can arise from direct inputs or measurements, and/or can be influenced by inputs relating to weather.

As can be appreciated from the illustrative example of FIG. 3, in accordance with at least one embodiment of the invention, there may be sparse observations at best about events, at least in the form of messages, thus a predicted probability of delays may not be accurate. Due to such sparse observations, priors accordingly play an important role in determining the accuracy of a reasoning process, until such a time that more observations/insights are accumulated from messages. One way of initializing priors is by using historical traffic related events across different locations in a city.

In accordance with at least one embodiment of the invention, a random variable $delay_{s_i}$ is associated with each stop $s_i$ in a route network represented by a set of delays, $D=\{delay_{s_i}, \forall_{s_i} \in S\}$. A $delay_{s_i}$ at a stop $s_i$ is influenced by various traffic events at stop $s_i$, $E_{s_i}=\{e^1, e^2, \ldots e^n\}$, where $e^j$ is an event type. The probability of seeing a delay at a stop depends on events at the stop, and a prior probability of seeing a delay at the stop, and can be expressed as follows:

$$P(delay_{s_i} \mid E_{s_i}) = \frac{P(delay_{s_i} \mid E_{s_i})P(delay_{s_i})}{P(E_{s_i})}$$

Figure 4:
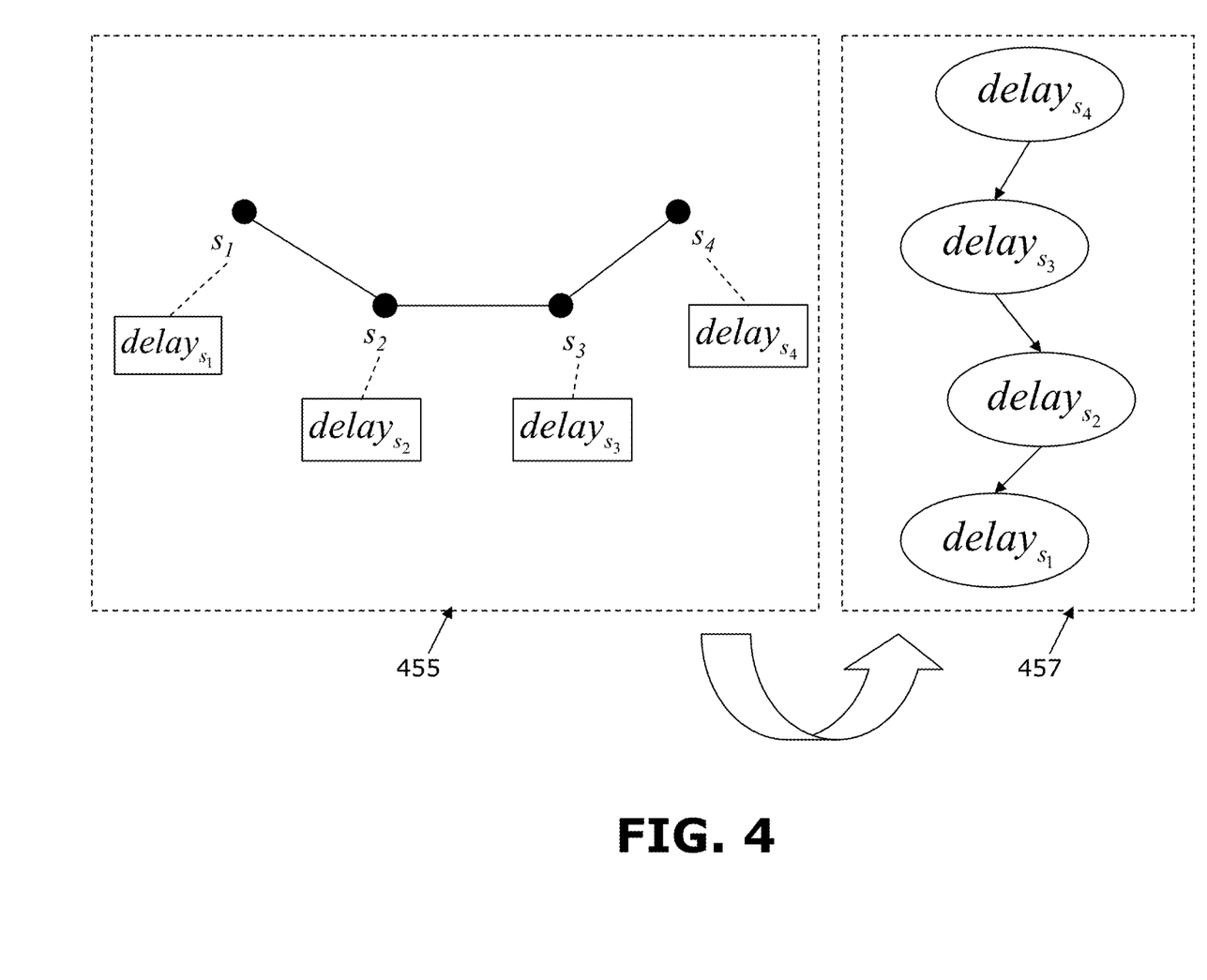
FIG. 4 schematically illustrates the impact of an event on delay as propagated across several stops.

FIG. 4 schematically illustrates the impact of an event on delay as propagated across several stops, in accordance with an illustrative and non-restrictive example in accordance with at least one embodiment of the invention. In the illustrated example of FIG. 4, there is a route 455 with four stops $s_1$, $s_2$, $s_3$, $s_4$, wherein a vehicle (e.g., scheduled bus) moves through the route from $s_1$ towards $s_4$. The variables $delay_{s_1}$, $delay_{s_2}$, $delay_{s_3}$, $delay_{s_4}$ are random variables capturing the state of delay at respective stops; each can assume a state of "yes" or "no". (In this vein, it should be understood that yes/no states of a random variable correspond to whether the corresponding stops will see a delay or not. The associated probability value is 1/0, which is also referred to as True/False, respectively, in probability calculation equations.) As an example, actual steps in this process can be undertaken via a loopy belief propagation algorithm (as discussed, for example, in Koller, D., Friedman, N., *Probabilistic Graphical Models: Principles and Techniques*, MIT Press (2009)).

As such, in accordance with at least one embodiment of the invention, it can be recognized that the delay impact at a node will affect delay at its neighboring node, since the nodes are interconnected to each other by links. For computational efficiency, as depicted in dependency graph 457, the impact propagation relative to route 455 can thus be limited such that it is only considered from a link to the previous link; e.g., if traveling from $s_1$ to $s_2$, the delay at $s_1$ is influenced only by the delay at $s_2$. This can be considered to be a realistic assumption in the traffic domain. In other words, it can be assumed that a delay at a node $s_i$ depends on node $s_{i+1}$, and not on any other nodes in the route network.

Figure 5:
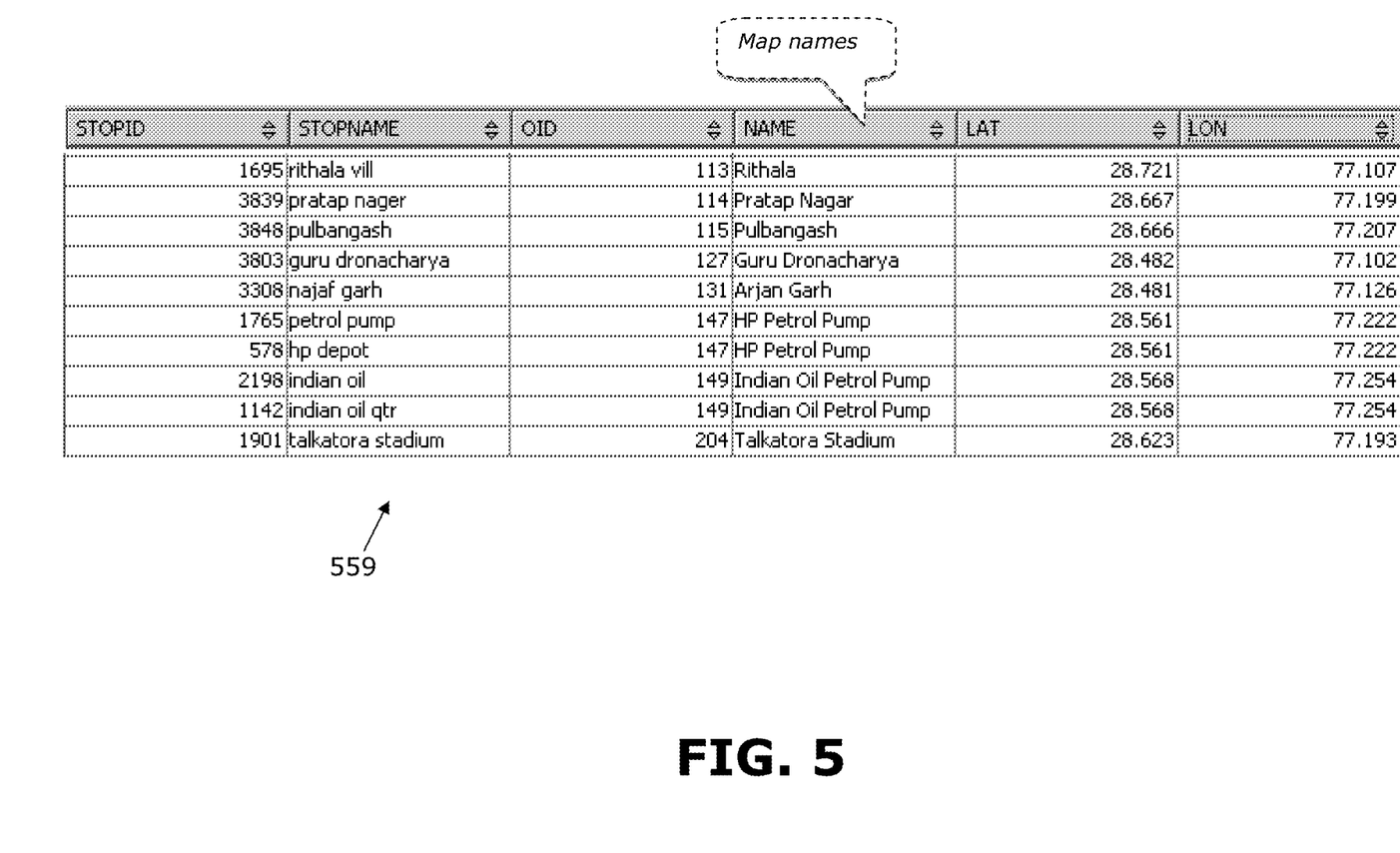
FIG. 5 schematically illustrates the matching of stop names to a map location.

FIG. 5 schematically illustrates the matching of stop names to a map location in a table 559, in accordance with an illustrative and non-restrictive example in accordance with at least one embodiment of the invention (here, using the example of a map resource such as OSM). In the illustrated example of FIG. 5, 3931 multi-modal stops in Delhi are considered. A matching algorithm involves breaking stop name phrases into words, applying distance metrics, and applying a voting scheme to select the best match. Confidence labels can be applied to the matches; thus, if four distance metrics are applied to the stops, matches can categorized as confident (more than two of the four techniques resulted in the same match), undecidable/inconclusive (two resulted in the same match), and uncertain (zero or one resulted in the same match).

By way of brief recapitulation, it can be appreciated from the foregoing that, in accordance with at least one embodiment of the invention, existing event information can be used to assess a lower-bound of delaying impact, while accounting for time and direction of travel and including an attenuation function based on event types. Any known information can be used or leveraged regarding inter-event relationships, and databases relating to historically encountered events can be consulted to assess probability and correlate with estimated delays. Generally, methods and arrangements as broadly contemplated herein can be useful not only for transportation settings but also in essentially any network involving discrete flows and some form of scheduling.

Figure 6:
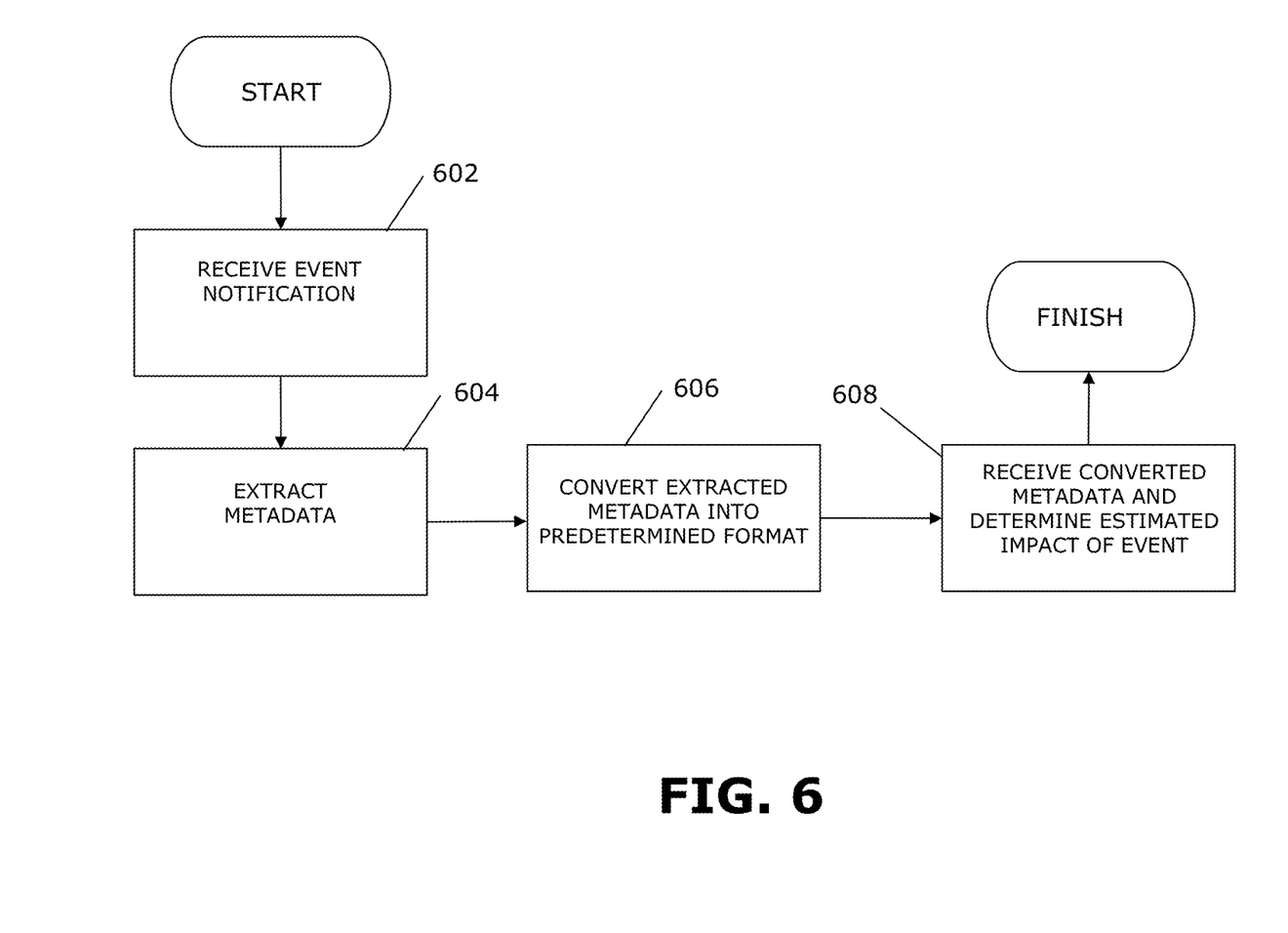
FIG. 6 sets forth a process more generally for assessing impact of an event on a network.

FIG. 6 sets forth a process more generally for assessing impact of an event on a network, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, an event notification associated with an event affecting traffic in a network is received (602). Metadata are extracted from the event notification, the metadata including at least one of: location information, time information, and event type information (604). The extracted metadata are converted into a predetermined format for processing (606). The converted metadata are received and, using the converted metadata, an estimated impact of the event on traffic in the network is determined (608).

Figure 7:
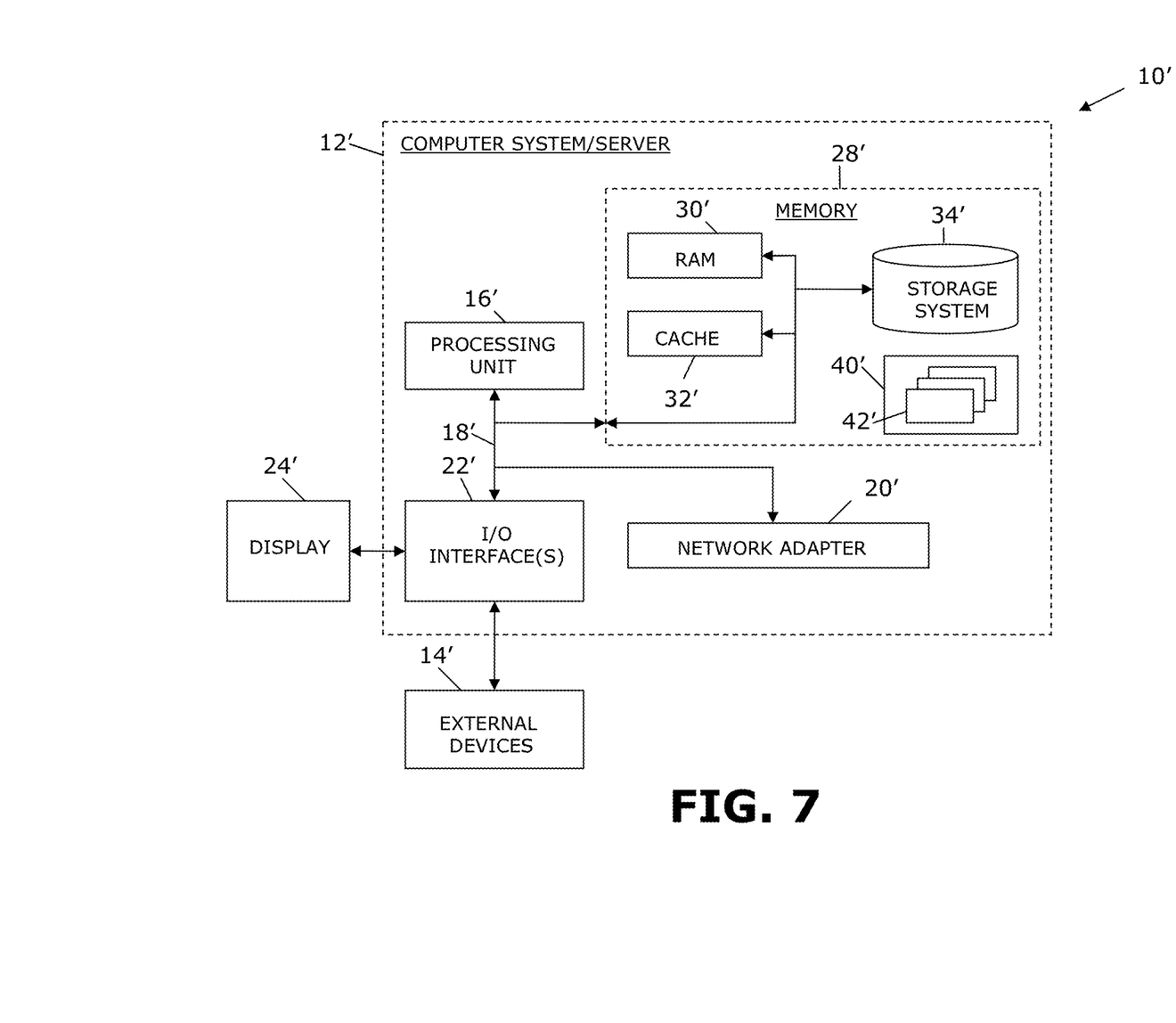
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of assessing impact of an event on a transport network, said method comprising:
utilizing at least one processor to execute computer code configured for:
receiving, using the at least one processor, an event notification provided in an identified format and containing information associated with more than one event, wherein at least one of the more than one events affects at least one target vehicle in the transport network, wherein the at least one vehicle follows a predetermined route comprising a plurality of stops in the transport network;

extracting, using the at least one processor, metadata for each of the events from the event notification, the metadata including at least one of: event location information, event time information, and event type information, wherein the extracting comprises:
comparing the event notification to a plurality of event models, wherein each of the plurality of event models is associated with an extraction pattern;
identifying the event model relevant to each of the events contained within the event notification based upon a pattern of the event notification; and
extracting the metadata for each of the events from the event notification using the extraction pattern associated with the identified event model;

storing, within a database, the metadata extracted from the event notification, wherein the metadata stored within the database is utilized to tune the plurality of event models via, at least, identifying, within a database, a frequency of occurrence of attributes of events;

converting, using the at least one processor, the event notification provided in the identified format to a notification having a predetermined format different from the identified format by using the extracted metadata for the at least one of the more than one events, affecting the at least one target vehicle;

determining, using the converted metadata, an estimated impact of the at least one of the more than one events on the at least one target vehicle in the transport network and storing the estimated impact of the event;
said determining comprising:
estimating, using the at least one processor, a delay with respect to at least one stop in the plurality of stops for the at least one target vehicle in the transport network; and
determining, using the at least one processor, a probability of a delay occurring at the at least one stop, depending on one or more events at the stop and a prior probability of a delay occurring at the at least one stop, wherein the prior probability of a delay is determined, at least in part, utilizing the frequency of occurrence identified by and stored within the database, wherein the determining further comprises storing the probability of delay in an events database; and providing, responsive to a user requesting, within an application, information associated with the at least one stop, the stored estimated impact, wherein the providing comprises querying the events database for the probability of delay.

2. The method according to claim 1, wherein the event notification comprises an SMS notification.

3. The method according to claim 1, wherein the transport network is a public transportation network.

4. The method according to claim 1, wherein said extracting comprises consulting one or more extraction rules.

5. The method according to claim 4, comprising consulting a historical database of events to revise the one or more extraction rules.

6. The method according to claim 1, wherein the event notification includes an event location and time.

7. The method according to claim 6, wherein:
the transport network is a public transportation network; and
said converting comprises converting the extracted metadata into a format relating to at least one stop for a public transit vehicle in the public transportation network.

8. The method according to claim 7, wherein said estimating comprises estimating a delay with respect to at least one stop for the public transit vehicle.

9. The method according to claim 8, wherein said estimating comprises tailoring an estimate based on at least one of: an attenuation function relative to event type, a time of day, and a history of related events.

10. The method according to claim 8, comprising communicating at least one calculated delay with respect to at least one neighboring stop relative to the event.

11. The method according to claim 8, wherein said estimating comprises developing a conditional probability table.

12. An apparatus for assessing impact of an event on a transport network, said apparatus comprising:
at least one processor; and
a non-transitory computer readable storage medium having computer readable program code embodied therewith and executable by the at least one processor, the computer readable program code comprising:
computer readable program code configured to receive, using the at least one processor, an event notification provided in an identified format and containing information associated with more than one event, wherein at least one of the more than one events affects at least one target vehicle in the transport network, wherein the at least one vehicle follows a predetermined route comprising a plurality of stops in the transport network;
computer readable program code configured to extract, using the at least one processor, metadata for each of the events from the event notification, the metadata including at least one of: location information, time information, and event type information, wherein the extracting comprises:
comparing the event notification to a plurality of event models, wherein each of the plurality of event models is associated with an extraction pattern;
identifying the event model relevant to each of the events contained within the event notification based upon a pattern of the event notification; and
extracting the metadata for each of the events from the event notification using the extraction pattern associated with the identified event model;
computer readable program code configured to store, within a database, the metadata extracted from the event notification, wherein the metadata stored within the database is utilized to tune the plurality of event models via, at least, identifying, within a database, a frequency of occurrence of attributes of events;
computer readable program code configured to convert, using the at least one processor, the event notification provided in the identified format to a notification having a predetermined format different from the identified format by using the extracted metadata for the at least one of the more than one event, affecting the at least one target vehicle;
computer readable program code configured to determine, using the converted metadata, an estimated impact of the at least one of the more than one events on the at least one target vehicle in the transport network and storing the estimated impact of the event;

the determining comprising:
estimating, using the at least one processor, a delay with respect to at least one stop in the plurality of stops for the at least one vehicle in the transport network; and
determining, using the at least one processor, a probability of a delay occurring at the at least one stop, depending on one or more events at the stop and a prior probability of a delay occurring at the at least one stop, wherein the prior probability of a delay is determined, at least in part, utilizing the frequency of occurrence identified by and stored within the database, wherein the determining further comprises storing the probability of delay in an events database; and
computer readable program code configured to provide, responsive to a user requesting, within an application, information associated with the at least one stop, the stored estimated impact, wherein the providing comprises querying the events database for the probability of delay.

13. A computer program product for assessing impact of an event on a transport network, said computer program product comprising:
a non-transitory computer readable storage medium having computer readable program code embodied therewith, the computer readable program code being executable by at least one processor, and comprising:
computer readable program code configured to receive, using the at least one processor, an event notification provided in an identified format and containing information associated with more than one event, wherein at least one of the more than one events affects at least one target vehicle in the transport network, wherein the at least one vehicle follows a predetermined route comprising a plurality of stops in the transport network;
computer readable program code configured to extract, using the at least one processor, metadata for each of the events from the event notification, the metadata including at least one of: location information, time information, and event type information, wherein the extracting comprises:
comparing the event notification to a plurality of event models, wherein each of the plurality of event models is associated with an extraction pattern;
identifying the event model relevant to each of the events contained within the event notification based upon a pattern of the event notification; and
extracting the metadata for each of the events from the event notification using the extraction pattern associated with the identified event model;
computer readable program code configured to store, within a database, the metadata extracted from the event notification, wherein the metadata stored within the database is utilized to tune the plurality of event models via, at least, identifying, within a database, a frequency of occurrence of attributes of events;
computer readable program code configured to convert, using the at least one processor, the event notification provided in the identified format to a notification having a predetermined format different from the identified format by using the extracted metadata for the at least one of the more than one event, affecting the at least one target vehicle;
computer readable program code configured to determine, using the converted metadata, an estimated impact of the at least one of the more than one events on the at least one target vehicle in the transport network and storing the estimated impact of the event;

the determining comprising:
estimating, using the at least one processor, a delay with respect to at least one stop in the plurality of stops for the at least one vehicle in the transport network; and
determining, using the at least one processor, a probability of a delay occurring at the at least one stop, depending on one or more events at the stop and a prior probability of a delay occurring at the at least one stop, wherein the prior probability of a delay is determined, at least in part, utilizing the frequency of occurrence identified by and stored within the database, wherein the determining further comprises storing the probability of delay in an events database; and
computer readable program code configured to provide, responsive to a user requesting, within an application, information associated with the at least one stop, the stored estimated impact, wherein the providing comprises querying the events database for the probability of delay.

14. The computer program product according to claim 13, wherein the event notification comprises an SMS notification.

15. The computer program product according to claim 13, wherein the event notification includes an event location and time.

16. The computer program product according to claim 15, wherein:
the transport network is a public transportation network; and
said computer readable program code is configured to convert the extracted metadata into a format relating to at least one stop for a public transit vehicle in the public transportation network.

17. The computer program product according to claim 16, wherein said computer readable program code is configured to estimate a delay for the public transit vehicle with respect to at least one stop.

18. A method comprising:
utilizing at least one processor to execute computer code configured for:
receiving, using the at least one processor, at least one SMS notification provided in an identified format and containing information corresponding to more than one event in a public transportation network comprising at least one target vehicle that follows a predetermined route comprising a plurality of stops in the public transportation network, wherein at least one of the more than one events affects the at least one target vehicle;
extracting, using the at least one processor, metadata for each of the events from the at least one SMS notification, wherein the extracting comprises:
comparing the event notification to a plurality of event models, wherein each of the plurality of event models is associated with an extraction pattern;
identifying the event model relevant to each of the events contained within the event notification based upon a pattern of the event notification; and
extracting the metadata for each of the events from the event notification using the extraction pattern associated with the identified event model;
storing, within a database, the metadata extracted from the event notification, wherein the metadata stored within the database is utilized to tune the plurality of event models via, at least, identifying, within a database, a frequency of occurrence of attributes of events;

thereupon:
converting, using the at least one processor, the event notification provided in the identified format to a notification having a predetermined format different from the identified format by using the extracted metadata for the at least one of the more than one events, affecting the at least one target vehicle;
estimating and storing in an events database, using the at least one processor, a scheduling delay relative to the at least one target location and relative to at least one location in the public transportation network; and
determining, using the at least one processor, a probability of the scheduling delay occurring at the at least one location, depending on one or more events at the location and a prior probability of a delay occurring at the at least one location, wherein the prior probability of a delay is determined, at least in part, utilizing the frequency of occurrence identified by and stored within the database, wherein the determining further comprises storing the probability of delay in an events database; and
providing, responsive to a user requesting, within an application, information associated with the at least one stop, the stored scheduling delay, wherein the providing comprises querying the events database for the probability of delay.

* * * * *